(12) United States Patent
Smith et al.

(10) Patent No.: US 6,607,581 B2
(45) Date of Patent: Aug. 19, 2003

(54) PASSIVE SAMPLING BADGE

(75) Inventors: Donald Lee Smith, West Newton, PA (US); Peter M. Hall, Venetia, PA (US)

(73) Assignee: SKC, Inc., Eighty Four, PA (US)

( * ) Notice: Subject to any disclaimer, the term of this patent is extended or adjusted under 35 U.S.C. 154(b) by 0 days.

(21) Appl. No.: 09/834,694

(22) Filed: Apr. 13, 2001

(65) Prior Publication Data

US 2002/0148355 A1 Oct. 17, 2002

(51) Int. Cl.[7] .................. B01D 53/04; G01N 1/22; G01N 30/06
(52) U.S. Cl. .................. 95/90; 95/87; 95/148; 95/900; 96/4; 96/101; 96/143; 96/151; 96/413; 73/19.02; 73/863.12; 73/863.21; 73/863.23; 422/88; 422/89; 436/178
(58) Field of Search .................. 96/101, 108, 106, 96/138, 143, 151, 413, 4; 95/82, 87, 90, 116, 141, 148, 900, 901, 45, 50; 73/19.02, 23.35, 23.42, 863.12, 863.21, 863.23; 422/88, 89; 436/178

(56) References Cited

U.S. PATENT DOCUMENTS

| | | | | |
|---|---|---|---|---|
| 4,003,257 A | * | 1/1977 | Fletcher et al. ........... 95/141 |
| 4,040,805 A | * | 8/1977 | Nelms et al. ............. 96/138 |
| 4,205,043 A | | 5/1980 | Esch et al. |
| 4,258,000 A | | 3/1981 | Obermayer |
| 4,327,575 A | * | 5/1982 | Locker ................... 422/88 |
| 4,350,037 A | * | 9/1982 | Higham ................. 73/863.21 |
| 4,630,755 A | * | 12/1986 | Campbell ................ 222/56 |
| 4,680,165 A | | 7/1987 | Vo-Dinh |
| 4,790,857 A | * | 12/1988 | Miksch .................. 95/45 |
| 4,805,441 A | * | 2/1989 | Sides et al. ............. 96/106 |
| 4,849,179 A | * | 7/1989 | Reinhardt et al. ......... 422/89 |
| 5,201,231 A | | 4/1993 | Smith |
| 5,482,677 A | * | 1/1996 | Yao et al. .............. 73/863.21 |
| 5,517,866 A | * | 5/1996 | Manning et al. ......... 73/863.21 |
| 5,574,230 A | * | 11/1996 | Baugh .................. 73/863.21 |
| 5,635,403 A | * | 6/1997 | Bailey .................. 436/178 |
| 5,970,804 A | * | 10/1999 | Robbat, Jr. ............ 73/863.12 |
| 6,050,150 A | | 4/2000 | Underhill et al. |
| 6,063,041 A | * | 5/2000 | Flament et al. .......... 600/573 |

* cited by examiner

Primary Examiner—Duane Smith
Assistant Examiner—Jason M. Greene
(74) Attorney, Agent, or Firm—William L. Krayer

(57) ABSTRACT

A passive air sampler is designed to facilitate emptying granular or particulate adsorbent from it directly into a thermal desorption tube or other vessel for use in an analytical instrument. The preferred form has an adsorbent container in a conical or funnel-like shape.

18 Claims, 9 Drawing Sheets

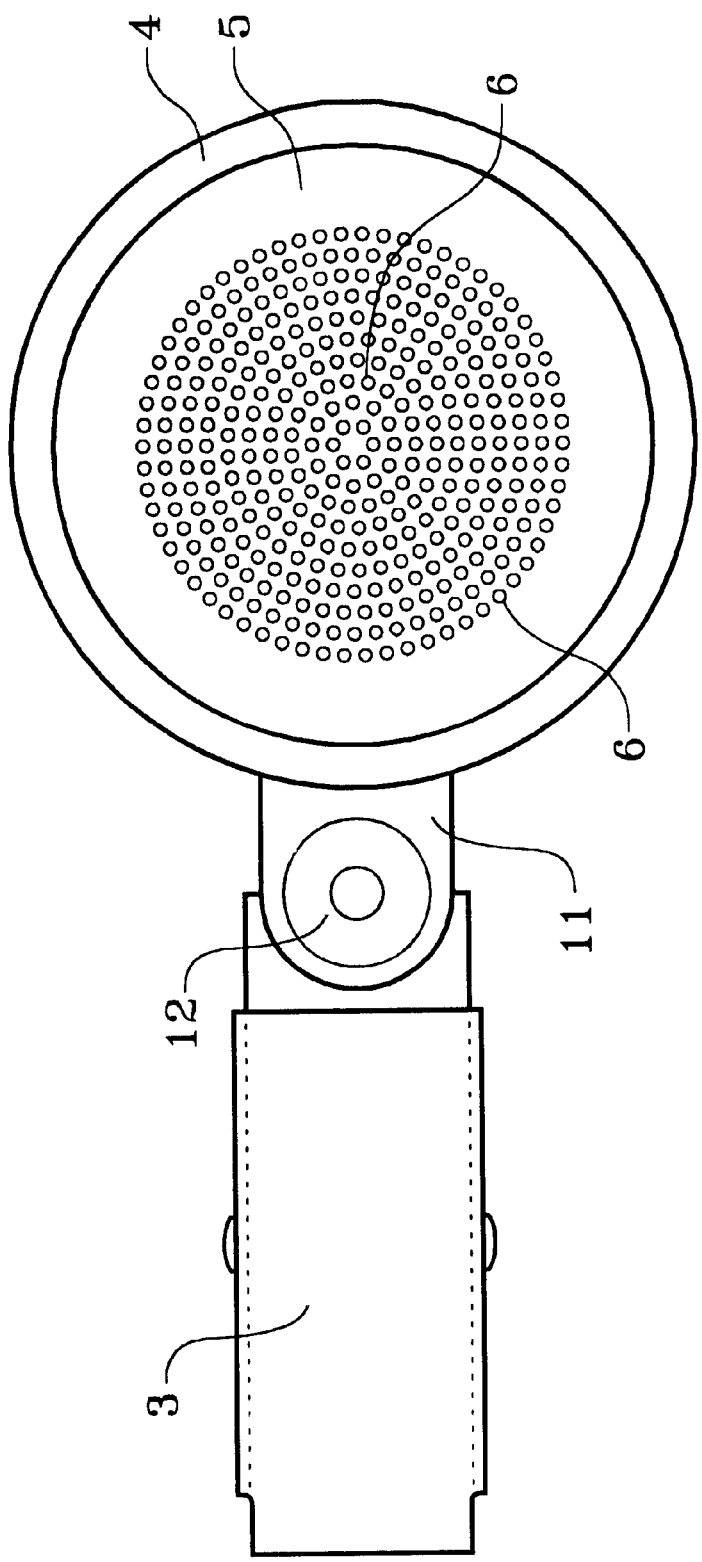

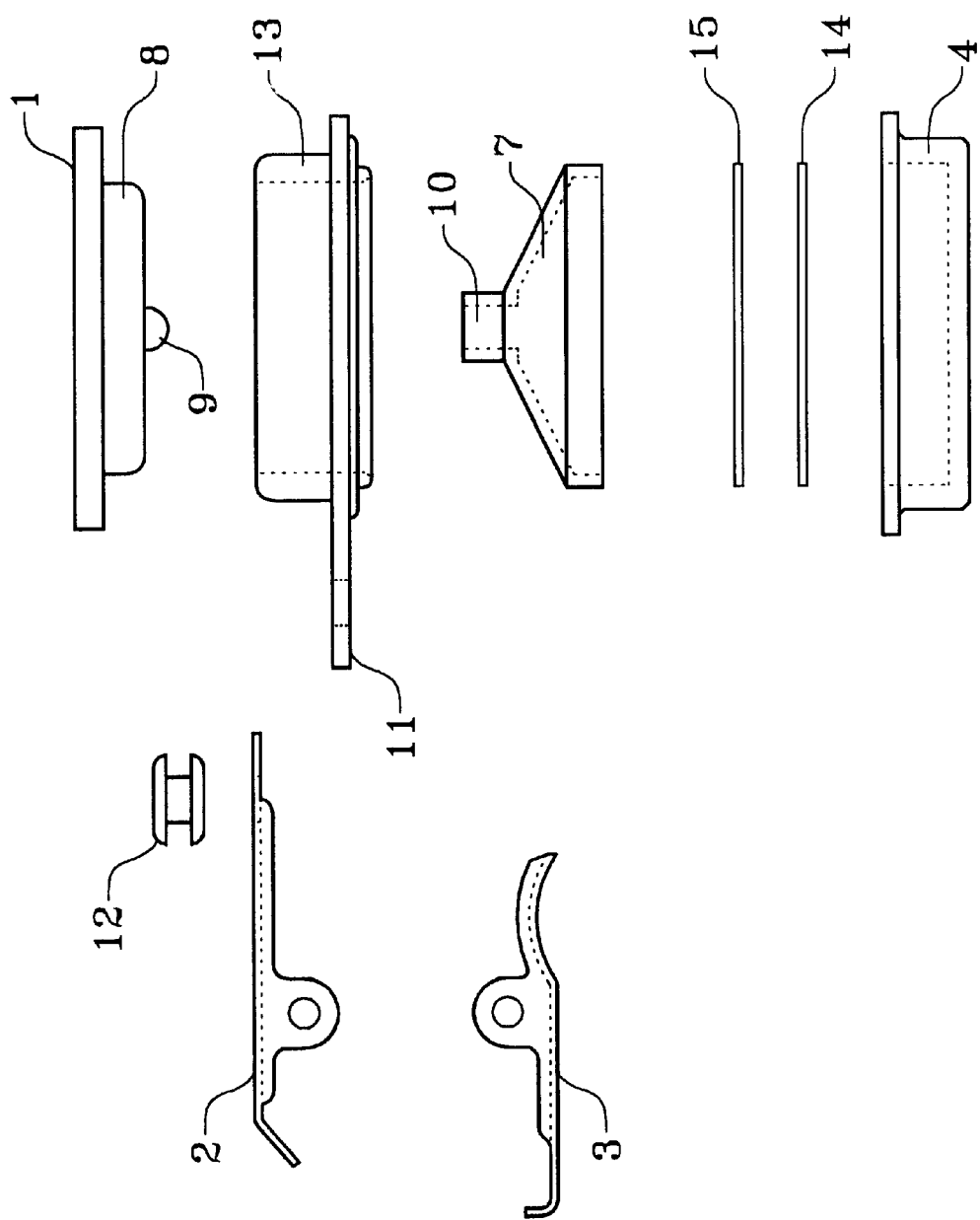

PASSIVE SAMPLING BADGE

TECHNICAL FIELD

This invention relates to sampling of air contaminants and particularly to passive air samplers of the type worn as a badge.

BACKGROUND OF THE INVENTION

Passive air samplers are devices worn by personnel working in environments in which it is desirable to monitor exposure to various contaminants in the air, usually organic vapors. Such devices are known as badges because they can be clipped or otherwise temporarily fastened to the user's clothing and worn there for a predetermined period of time, usually the entire shift or other working period in the atmosphere in question. The badges are called passive samplers because there is no pump or other accessory to assure the flow of air through it. Sampling relies on simple exposure to the atmosphere, not a measured or predetermined flow volume, but sampling badges may be distinguished from indicating badges, in that indicating badges may change color in the presence of a specific contaminant. In a sampling badge, extraction of the contaminants such as volatile organics from the air is accomplished by adsorbents in the badge. They are usually granular, made of porous polymer or sometimes activated carbon, and may or may not be treated to enhance the ability to adsorb a particular organic chemical.

Where the identification and quantification of the adsorbed material is to be performed by gas chromatography, the used adsorbent is subjected to thermal desorption and/or flushed with an inert gas such as nitrogen for sending to the gas chromatograph. For use in the gas chromatograph, the inert gas containing the desorbed contaminant is passed through a standard thermal desorption sampler tube which contains a second adsorbent. The material is then analyzed by the standard gas chromatographic techniques, which involve passing a further inert gas through the thermal desorption sampler tube.

Patents illustrating passive air sampling badges include Nelms et al U.S. Pat. No. 4,040,805 and Esch et al U.S. Pat. No. 4,205,043. See also Obermayer U.S. Pat. No. 4,258,000, Braun et al U.S. Pat. No. 3,950,980, Vo-Dinh U.S. Pat. No. 4,680,165 and Underhill et al U.S. Pat. No. 6,050,150. None of these describes the features of the present invention.

In the conventional process of interest in the present review, the contaminant is first picked up on an adsorbent in the badge, the contaminant is desorbed from the badge adsorbent and picked up on the chromatograph adsorbent, and then desorbed again for the acutal analysis. This process has been criticized for having too many steps, which are time-consuming and may be a source of error, and for excessive adsorbing and desorbing, which can also lead to error. In addition, whether or not the adsorbent must be removed from the badge for the initial desorbing step, the badge must be manipulated or even taken apart to get at or remove the adsorbent in some way for the first desorbing step. A simpler device and method for passive sampling and analysis would advance the art.

SUMMARY OF THE INVENTION

We have invented a device and method for the passive sampling of air which involves only one desorption step. It is simple to use and less subject to error than systems used in the past.

Our passive sampler is designed to permit a simple transfer of the adsorbent from the badge directly into an empty thermal desorption sample tube for use in a gas chromatograph. Our invention includes a passive air sampler comprising particulate adsorbent and a container therefor, the container including an opening for draining to empty the particular adsorbent by gravity from the container and having a shape to facilitate the draining.

BRIEF DESCRIPTION OF THE DRAWINGS

FIGS. 1a, 1b, 1c, and 1d show the back, vertical section, front and perspective views of a preferred design of our invention to be worn by a user.

FIG. 2 illustrates the assembly of the preferred device.

DETAILED DESCRIPTION OF THE INVENTION

Figure 1A:
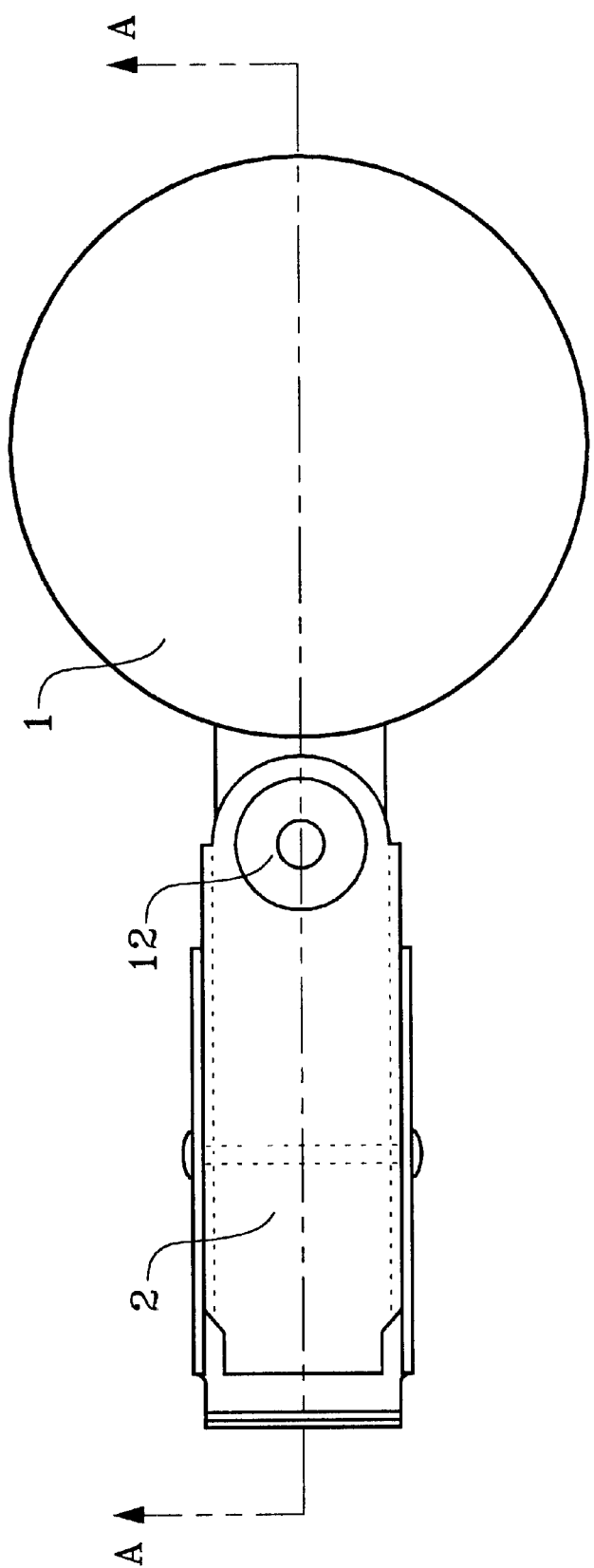
Figure 1B:
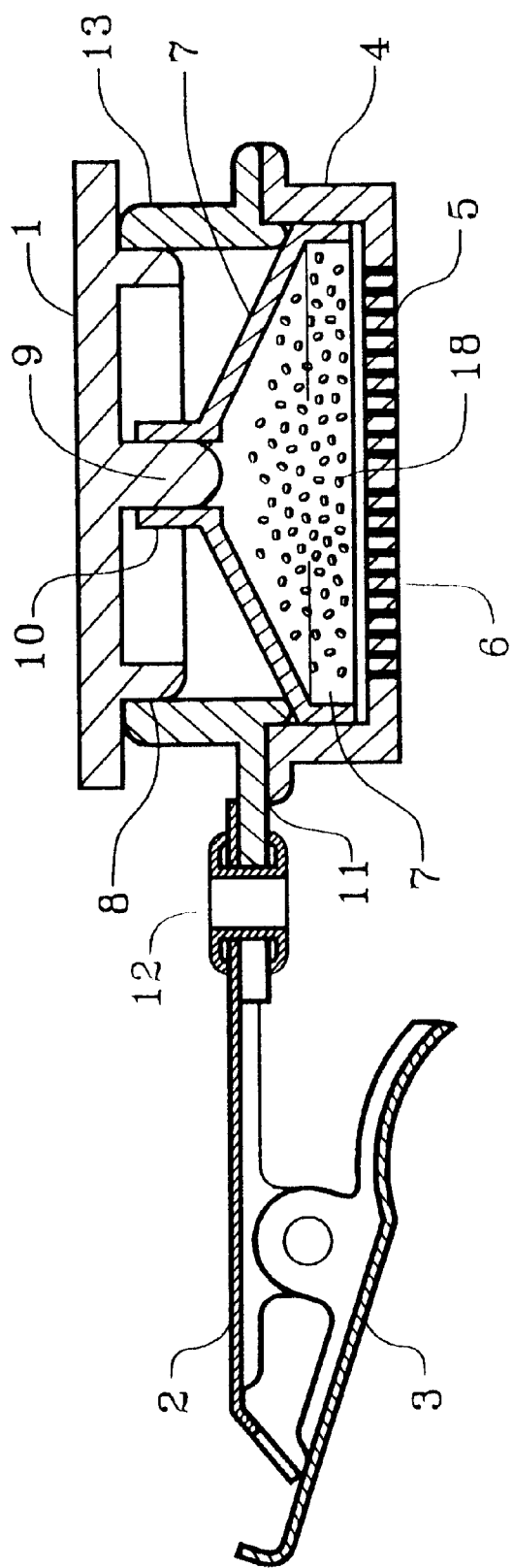
Figure 1D:
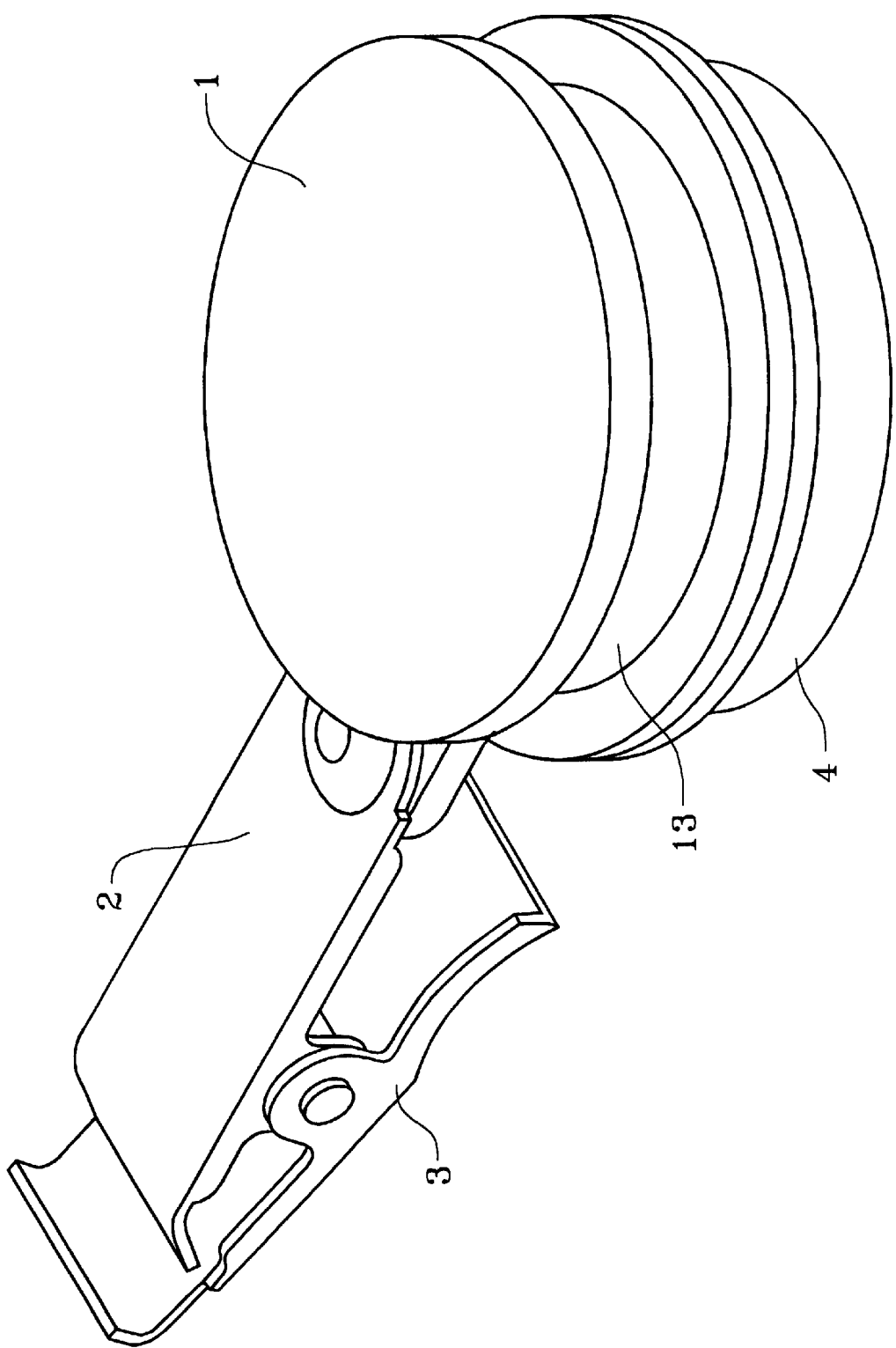

Referring now to FIGS. 1a–1d, a preferred passive sampler is in the form of a badge having a badge base 4, a badge body 13, a back 1 and a fastener 2 for holding the badge to the user's clothing. The fastener 2 may have a spring-actuated clip handle 3 and may be mounted on a swivel 12 through attachment 11. The front 5 of the sampler has a plurality of apertures 6 for admitting the atmosphere to its interior. FIG. 1b is a section of the sampler, showing that back 1 has a lip 8 for fitting into badge body 13 and a protursion 9 which is inserted into neck 10 of adsorbent container 7. Adsorbent container 7 holds adsorbent material 18, shown here as particulate material such as activated carbon. Other useful particulate or granular adsorbents are TENAX, ANASORB 747, and ANASORB CMS. Any synthetic or natural material capable of adsorbing the target contaminant may be used. Preferably container 7 is filled with such adsorbent material 18. The adsorbent material 18 is preferably held compactly in the container 7 yet loosely enough to permit air to penetrate to its interior in order to pick up contaminants.

In FIG. 2, the parts of the badge are dissembled to illustrate their relationship. Badge base 4 retains the front 5 as shown in FIGS. 1b and 1c. A membrane 14 may optionally be placed next to it to reject water in the air. For this purpose a water-selective membrane made by Celgard, Inc. and designated CELGARD may be used. Gaseous water vapor is not undesirable, but water droplets, however small, are generally not wanted in the sampler. Next to the membrane 14 is a screen 15, designed and positioned to separate the adsorbent from the membrane, and to form a conducting surface around the adsorbent to minimize electrostatic attraction of the adsorbent to the interior of the unit. The conical-shaped adsorbent container 7 is next placed in the badge base 4. Badge body 13 is then placed on top of container 7, and fastener 2 is attached by inserting swivel 12 through the fastener and attachment 11. Adsorbent container 7 is filled with adsorbent by pouring the granular or particulate adsorbent through neck 10 of container 7. Back 1 is then lowered onto the badge body 13 so that lip 8 can fit snugly into it, at the same time inserting projection 9 into neck 10 of container 7. Preferably the amount of granular or particulate adsorbent is such that the projection 9 touches it lightly. As will be seen in connection with FIGS. 3b and 3c, the volume of adsorbent is preferably an amount which will fill a thermal desorption tube 17; accordingly the internal volume of adsorbent container 7 is preferably no greater than that of the thermal desorption tube 17. The fully assembled badge is now ready for use. New badges will be protected from ambient air by a further protective covering of any suitable kind, not shown, to prevent contamination before actual use. After removing the protective covering, the user may attach the badge to his or her clothing using the fastener 2. Usually it will be attached to the collar or otherwise relatively near the head in order to sample the air close to that which is actually breathed by the user.

Figure 3A:
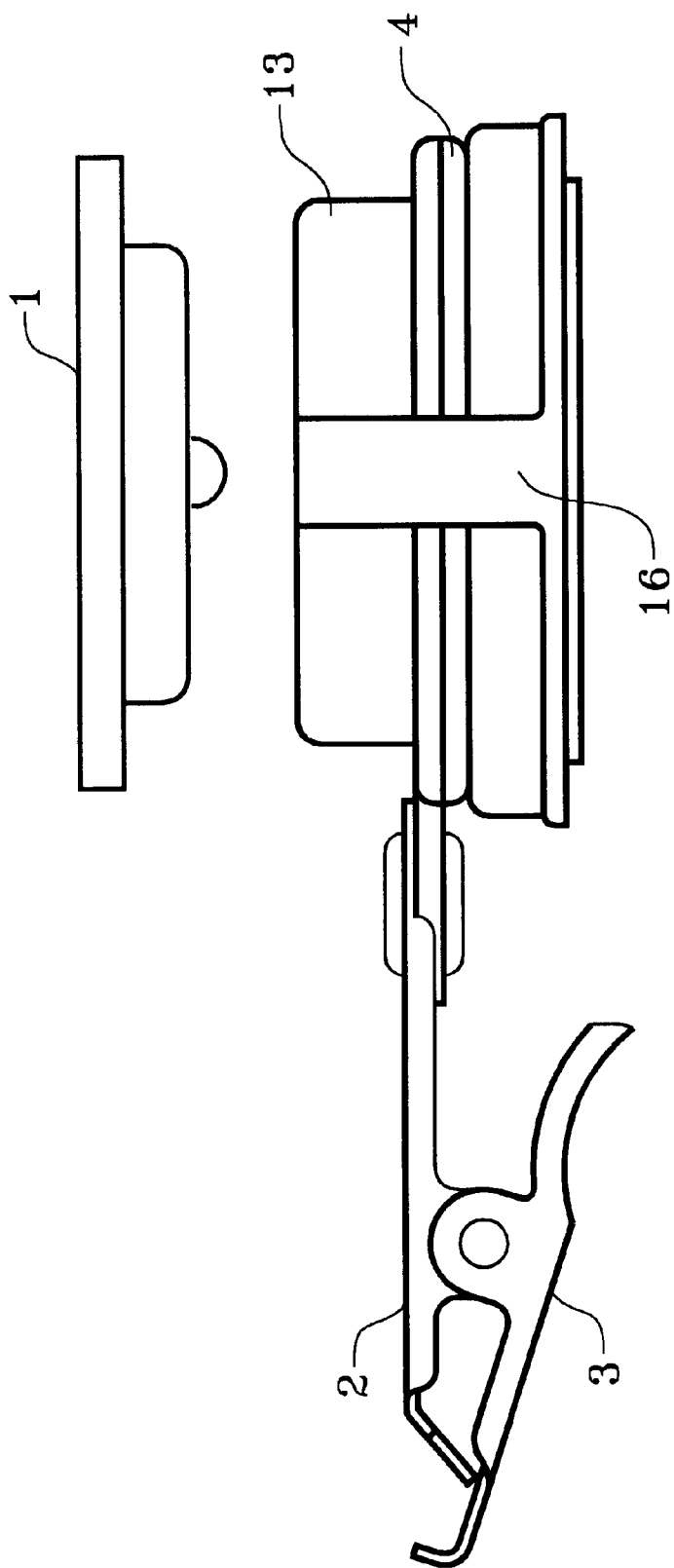
FIGS. 3a, 3b, and 3c show the steps for transfer of the adsorbent from the badge to the thermal desorption tube.
Figure 3B:
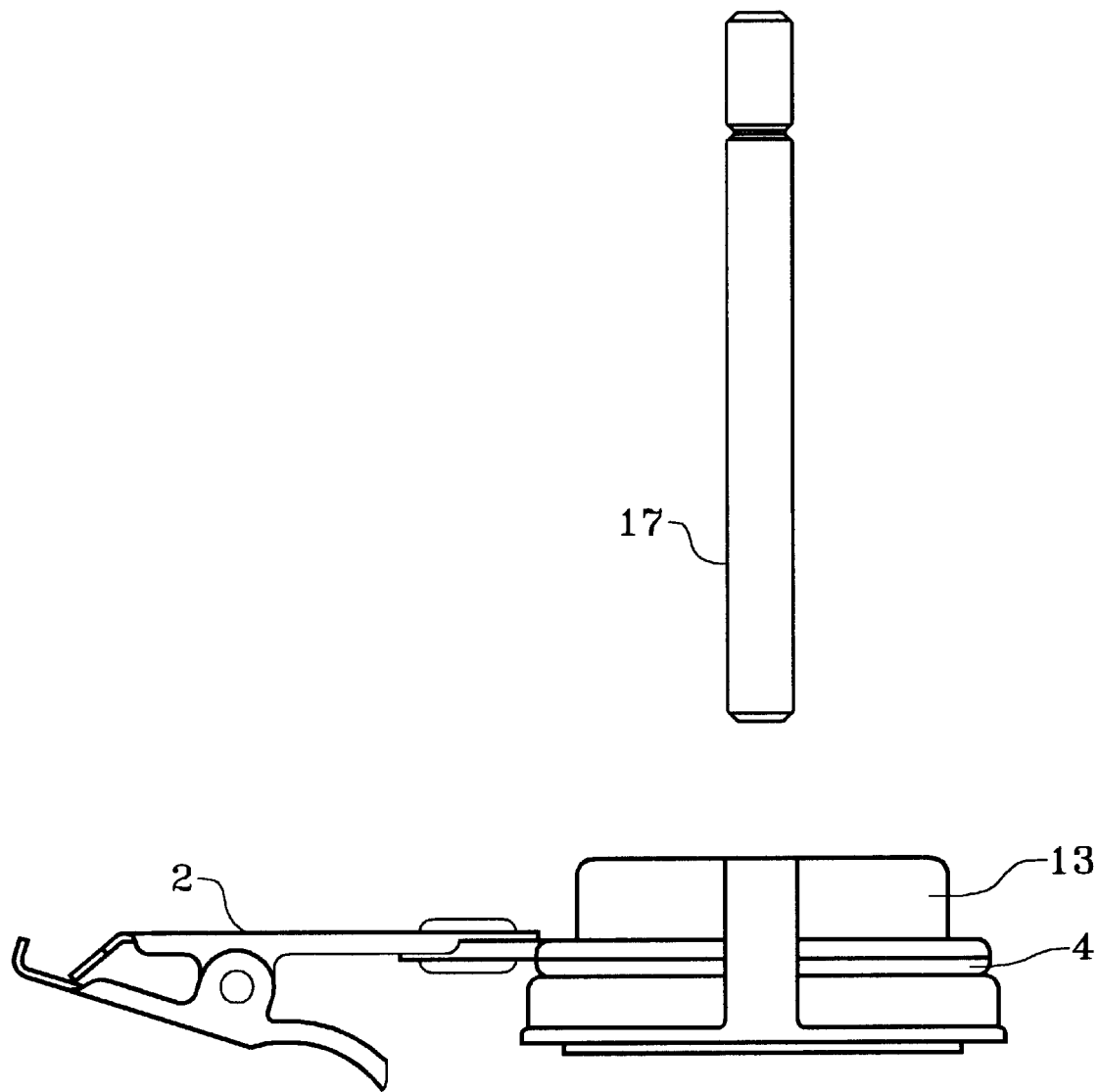
Figure 3C:
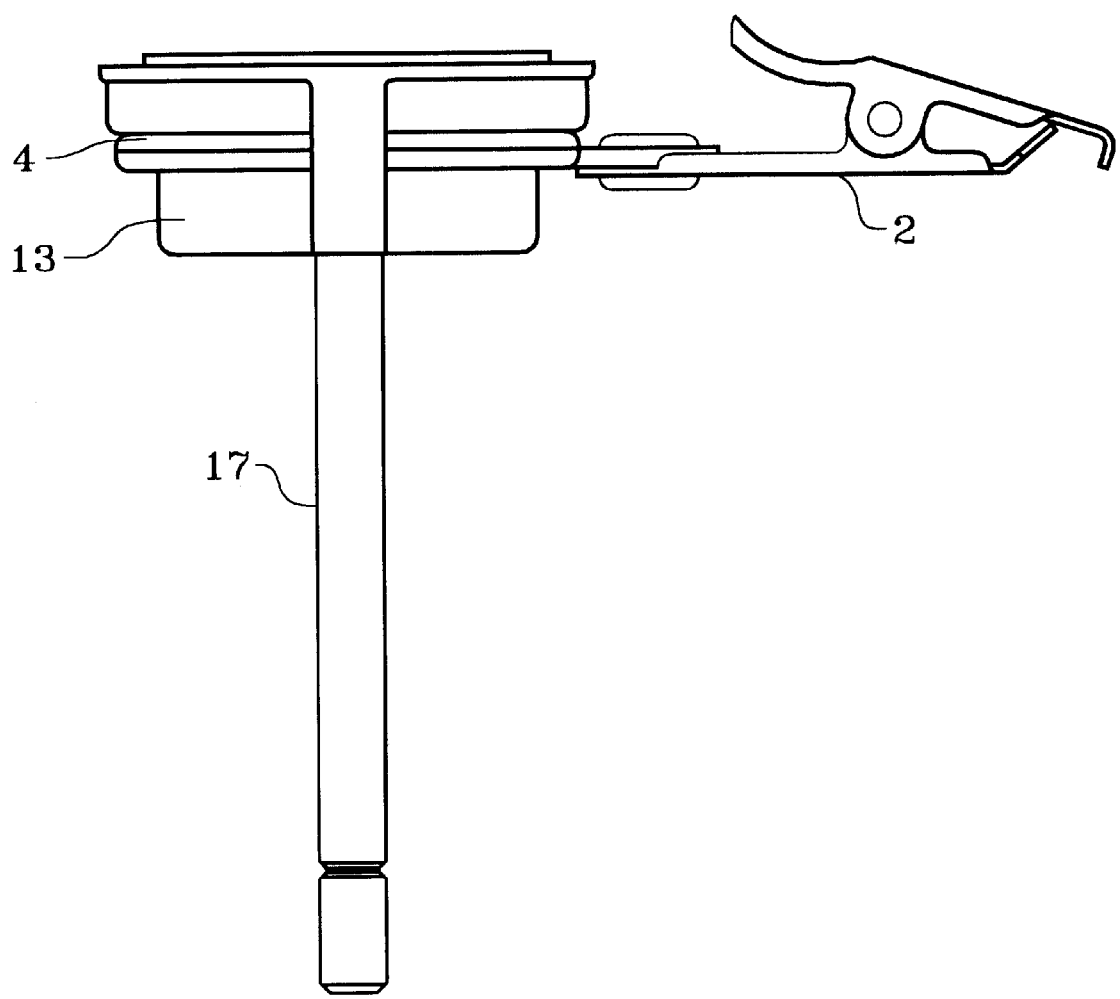

In FIGS. 3a–c, after use, a barrier cover 16 is preferably placed on the badge to prevent further adsorption after the user is finished wearing it. Back 1 is carefully removed and a thermal desorption tube 17 is aligned with the center of the badge. The open end of the thermal desorption tube 17 is contacted with the exposed neck 10 (not shown in FIG. 3b) of container 7, and the assembly is then inverted as shown in FIG. 3c so the adsorbent may drain from the container 7 into thermal desorption tube 17, substantially filling it. The reason for the preferred conical shape of container 7 is apparent—the conical shape permits the adsorbent readily to drain into the thermal desorption tube. While we prefer a conical shape, any shape which permits draining of the adsorbent into the thermal desorption tube may be used.

Figure 4A:
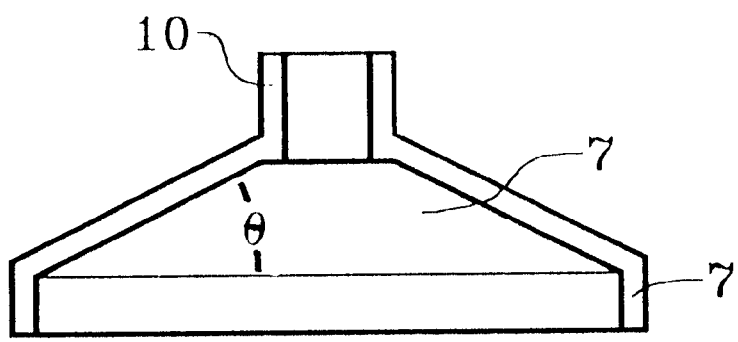
FIGS. 4a and 4b are a side sectional and a perspective view of the preferred conical adsorbent capsule of our invention.
Figure 4B:
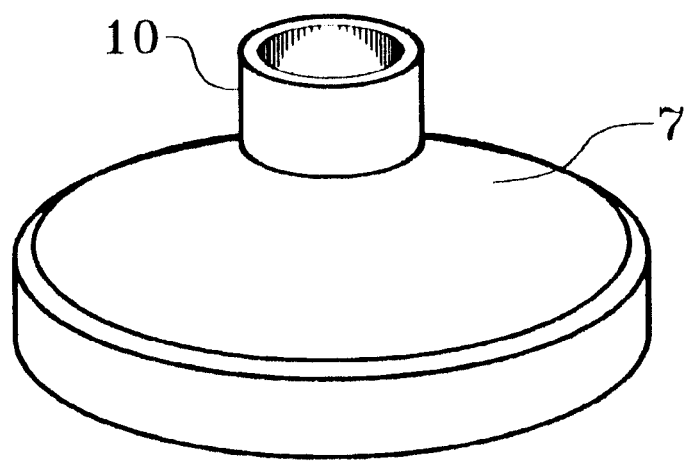

The preferred adsorbent container 7 having neck 10 is further illustrated in FIGS. 4a and 4b. The angle of the cone is not critical, but when the container is inverted, at least one inclined surface should be deployed to assist the draining of the adsorbent by gravity. Where a conical shape is used, the angle theta is preferably between 10 and 80°, more preferably between 15 and 45°, and most preferably between 20 and 35°. The illustrated angle is 27° and has been found quite satisfactory for any of the standard granular adsorbents.

We do not intend to be limited to adsorbent container shapes and designs which require inversion to drain the adsorbent. Any combination of shape and orientation of the adsorbent outlet which will facilitate the draining of adsorbent may be used. Likewise, the basic shape and construction of the container lends itself to variation. Lip 8 and badge body 13, for example may be of different configurations or not used at all, so long as the adsorbent can be conveniently placed in the unit and otherwise perform the functions outlined herein.

As is known in the art of analytical chemistry, one or more volatile contaminants contained in the particulate adsorbent may be released from the adsorbent by heating it, usually while passing an inert gas through the thermal desorption tube. Our invention includes the assembly of FIG. 3c, wherein the badge is connected to the thermal desorption tube 17. Alternatively the badge may be connected to any type of container to be used for extraction of the adsorbed material from the adsorbent such as, for example, by solvent extraction. Thus our invention includes a method of obtaining samples of contaminants in air comprising adsorbing the contaminants on a particulate adsorbent in a passive sampler and draining the particulate adsorbent by gravity from the sampler into a thermal desorption tube, and also includes a passive air sampler comprising particulate adsorbent and a container therefor, the container including an opening for draining to empty the particulate adsorbent by gravity from the container and having a shape to facilitate the draining; the opening is preferably one which will mate readily with the intake opening of a thermal desorption tube or other sample-receiving vessel used in chemical analysis.

What is claimed is:

1. A passive air sampler comprising particulate adsorbent and a container therefor having a generally conical shape, said container including an opening for draining to empty said particulate adsorbent by gravity from said container into a thermal desorption tube for chromatographic analysis.

2. A passive air sampler of claim 1 including a perforated panel to admit air to said container.

3. A passive air sampler of claim 1 including means for fastening said air sampler to a user's clothing.

4. A passive air sampler of claim 2 including a membrane for excluding water droplets from said container.

5. A passive air sampler of claim 2 including a screen for retaining adsorbent within said sampler.

6. A passive air sampler of claim 1 including at least one conductive surface for dispersing electrostatic charges.

7. A passive air sampler of claim 1 contacted with a vessel for receiving said particulate adsorbent from said container and extracting sampled material from said adsorbent.

8. A passive air sampler comprising a container for granular adsorbent and granular absorbent substantially filling the volume of said container, said container including an outlet neck for said adsorbent, a perforated panel for admitting air to said container, and a stopper for said outlet, said outlet neck being of a shape for mating with the intake opening of a sample-receiving vessel for chemical analysis.

9. A passive air sampler of claim 8 including means for attaching said sampler to the clothing of a user.

10. A passive air sampler of claim 8 wherein said adsorbent is a carbonaceous adsorbent.

11. A passive air sampler of claim 8 including a membrane near said panel for admitting air, for excluding water droplets in said air from said container.

12. A passive air sampler of claim 8 wherein said container has a conical shape.

13. A passive air sampler of claim 8 wherein said container has a shape substantially similar to a conical funnel.

14. Passive air sampler of claim 8 mated with a sample-receiving vessel for receiving said particulate adsorbent from said container.

15. Method of obtaining samples of contaminants in air comprising adsorbing said contaminants on a particulate adsorbent in a passive sampler, connecting a thermal desorption tube to said passive sampler, and draining said particulate adsorbent by gravity from said sampler into said thermal desorption tube.

16. Method of claim 15 wherein the volume of said particulate adsorbent in said passive sampler is no greater than the internal volume of said thermal desorption tube.

17. Method of claim 15 followed by desorbing said contaminants from said adsorbent into a carrier gas therefor in said thermal desorption tube and analyzing said carrier gas for said contaminants.

18. Method of claim 15 wherein said passive sampler is worn by a human.

* * * * *